United States Patent [19]

Hoelzlwimmer et al.

[11] Patent Number: 4,672,441
[45] Date of Patent: Jun. 9, 1987

[54] METHOD AND APPARATUS FOR PICTURE DATA REDUCTION FOR DIGITAL VIDEO SIGNALS

[75] Inventors: Herbert Hoelzlwimmer, Munich; Walter Tengler, Friedberg, both of Fed. Rep. of Germany

[73] Assignee: Siemens Aktiengesellschaft, Berlin and Munich, Fed. Rep. of Germany

[21] Appl. No.: 847,650

[22] Filed: Apr. 3, 1986

[30] Foreign Application Priority Data

Apr. 17, 1985 [DE] Fed. Rep. of Germany ....... 3513877

[51] Int. Cl.4 .......................................... H04N 7/137
[52] U.S. Cl. .................................. 358/135; 358/136; 375/27
[58] Field of Search ............... 358/133, 135, 136, 138; 375/27

[56] References Cited

U.S. PATENT DOCUMENTS

| | | | |
|---|---|---|---|
| 4,371,895 | 2/1983 | Koga | 358/136 |
| 4,394,774 | 7/1983 | Widercren | 358/136 |
| 4,541,012 | 9/1985 | Tescher | 358/135 |
| 4,591,909 | 5/1986 | Kuroda | 358/136 |

FOREIGN PATENT DOCUMENTS 0084270 7/1983 European Pat. Off. .

OTHER PUBLICATIONS

IEEE Interim Conference on Communication 1978 pp. 19.1.1–19.1.6.
Publication "Scene Adaptive Coder" by Pratt and Chen IEEE Transactions on Communications, vol. 32 No. 3 of Mar. 1984.
Publication "Image Transmission Techniques by William K. Pratt.
Publication in German NTG-Fachberichte Bd74 pp. 379–388.

Primary Examiner—Howard W. Britton
Attorney, Agent, or Firm—Hill, Van Santen, Steadman & Simpson

[57] ABSTRACT

Method and apparatus for the reduction of picture data for digital video signals comprising a processing of the signals by means of block by block transformation method so that a transformed and quantized signal which was generated at a time t−1 and placed in an image storage is subtracted from a transformed signal that occurs at a time t and whereby the difference signal obtained is subject to quantization and the quantized difference signal is subjected to an analysis and to a time delay which corresponds to the time requirement for the analysis for updating the content of the image storage. The signal delayed is added to the signal read out from the image storage which is also delayed and is added dependent on the addition condition signal obtained from the analysis and is subjected to an entropy coding dependent on the analysis results with the addition condition signals containing information as to whether a block which has been analyzed has been concluded is a moved or unmoved block and when the block is a moved block containing information regarding a coefficient group to be transmitted. The signal coded in such fashion is subjected to a buffering and depending on the degree of buffer filling a quantization stage and an analysis stage is influenced so that a signal from a buffer control is supplied to the quantization stage for the purpose of selecting one of a plurality of predetermined quantization characteristics and a second signal is supplied from the buffer control means to the analysis stage to select the maximum number of coefficient groups and a third signal is supplied to the analysis stage from the buffer control for the purpose of deciding whether a block is to be transmitted or not and the coefficients represent the digitized video signal transformed by block which is subdivided into coefficient groups.

22 Claims, 11 Drawing Figures $x(k,l,t)$ : Digital Signal
$y(u,v,t)$ : Transformation Coefficient
$y_p(u,v,t-1)$: Prediction Coefficient
$\Delta y_Q$ : Quantizer Prediction Factor
$\Delta y_C$ : Quantizer & Code Predicting Factor ND Max 1.) $N_O \leq 3$
$1 \leq N_D \leq N_D \text{ Max}$
$N_D \quad N_D \text{ Max}$ 2.) $4 \leq N_O \leq N_D \text{ Max}$
$4 \leq N_D \leq N_D \text{ Max}$
$N_O \quad N_D \quad N_D \text{ Max}$ $0 < B_\Delta \leq B_N < B_T < 1$

METHOD AND APPARATUS FOR PICTURE DATA REDUCTION FOR DIGITAL VIDEO SIGNALS

BACKGROUND OF THE INVENTION

1. Field of the Invention

The present invention relates to a method for picture data reduction for digital video signals comprising a preprocessing of the signals by means of block-by-block transformation whereby a transformed and quantatized signal which was generated at a time t-1 and deposited in an image storage is subtracted from a transformed signal which occurs at a time t and whereby the difference signal obtained in such manner is subjected to a quantization.

2. Description of the Prior Art

Prior art methods for picture data reduction can be subdivided into:

1. DPCM (Differential Pulse Code Modulation) methods-transformation methods; and
2. Hybrid methods.

In DPCM methods, the difference between an estimate determined from samples that have already been transmitted and the actual sample is respectively identified. In pure DPCM coders, this prediction occurs three-dimensionally, in other words, both within a frame or picture as well as from frame to frame.

In transformation methods, an imaging of the frame into the transformation region occurs. Due to the high cost, only two dimensional transformations have previously been realized in practice.

The present invention relates to a hybrid method. The principles of a hybrid method is illustrated in FIG. 1. In FIG. 1, a digitized signal x (k, e, t) is supplied to a transformation stage and produces a transformation coefficient signal y(u, v, t) which is supplied to a quantitizer Q which produces a signal Ya(u, v, t) which is supplied through an adder to a coder C which produces a signal Yc(u,v,t) which is supplied as the channel signal. The output of the quantitizer Q is also supplied to a predictor and memory P+M which supplies a signal $y_p$ (u, v,t−1) to an adder to add the signal to the output of the transformation stage before supplying it to the quantitizer Q.

Hybrid coding represents a mixture of transformation and DPCM. The transformation within a frame occurs two-dimensionally, block size 16×16 or 8×8 picture points, whereas DPCM operates from frame to frame. The signal decorrelated by transformation and/or DPCM is quantized and transmitted.

Basically, all hybrid methods operate according to the diagram illustrated in FIG. 1. In developed methods, the functions Q, P and C are adaptively executed European Patent Application No. 82.3070263 discloses a method which employs a coder having the following essential features:

Dynamic bit allocation—The bit rate is minimized and is selected from a plurality of Huffman code tables by means of a prediction algorithm for each coefficient to be coded.

Length of run coding—Zeros successively appearing along a defined scan direction are coded by lengths of run.

Constant Channel rate—Is achieved by coupling the quantitizer to the buffer filling. A PI controller with proportional integrating behavior is employed for this purpose.

The publication of F. May, "Codierung von Bildfolgen mit geringer Rate fur gestorte Uebertrangungskanale", NTG-Fachberichte, Vol. 74, pp. 379–388, describes a system for picture transmission using narrow-band radio channels with a transmission rate of 9.6K bit/s and a frame frequency of 0.5 frames. A plurality of bit allocation matrices are provided for this known method so that the optimum of the respective block is identified and transmitted in the form of a class affiliation. Optimum non-linear quantization characteristics are also employed with respect to the quadratic error. A constant channel rate is achieved by input buffer control, in other words, every frame is first analyzed, the number of coeficients to be transmitted is then modified until the channel rate is observed.

The publication of W. H. Chen, W. K. Pratt entitled "Scene Adaptive Coder", in the IEEE Trans. Comm., Vol. Com32, No. 3, of Mar. 1984, describes an adaptive band width compression technique which employs a discrete cosine transformation. This system is similar to that describes in European Patent Application No. 82.30 70 263 referenced above.

A publication of A. G. Tescher, entitled "Rate Adaptive Communication", appearing in the IEEE International Conference on Communication, of 1978, pages 1.1–19.1.6 describes a concept for a bit rate control in a source coding system.

The technical book publication of W. K. Pratt entitled Image Transformation Techniques, published by the Academic Press, New York, San Francisco, and London in 1979 provides overall discussion of the transformation techniques of the systems.

SUMMARY OF THE INVENTION

The object of the present invention is to provide a method of the species initially referenced which enables a picture quality which is improved significantly over known methods for the same or constant channel rate. In the invention, picture data reduction for digital video signals comprises preprocessing the signals using block-by-block transformation method whereby a transformed and quantitized signal that was generated at a time t-1 and placed in an image storer is subtracted from a transformed signal that occurs at a time t and whereby the difference acquired in this manner is subjected to a quantitization and the quantitized difference signal is subjected to an analysis and is subjected to a time delay VZ which corresponds to the time requirement for the analysis AS and on the one hand updating the content of the image storage and the signal which is delayed in this manner is added to the signal read out from the image storer M which is also correspondingly delayed and is added thereto dependent on the addition condition signal acquired from the analysis and on the other hand is subjected to an entropy coding HC depending on the analysis results. The addition condition signals containing information as to whether a block whose analysis has been concluded is a "moved" or a "unmoved" block and in case said block is a "moved" block containing information regarding a coefficient group to be transmitted, the coded signal is subjected to a buffering B which is intended to offer an output signal channel a uniform data flow for transmission and offering said uniform data flow from a nonuniform data flow of the entropy coding. Dependent on the degree of buffer filling, a quantization stage Q, an analysis stage AS is influenced so that a signal from a buffer control means BC is supplied to the quantization stage Q for selecting one of a plurality of predetermined quantization characteristics whereby a second signal is supplied from the buffer control means BC to the analysis stage AS for the purpose of selecting the maximum number of coefficient groups and where a third signal is supplied to the analysis stage AS from the buffer control means BC for deciding whether a block is to be transmitted or is not to be transmitted. The coefficients represent the digitized video signal transformed block-by-block which is subdivided into coefficient groups according to prescribed rules and a measurement scale for each of these coefficient groups is identified in a calculation stage E such that the scale first causes a supergroup to be formed in a decision means S from neighboring coefficient groups and to be transmitted and selected such that the coefficient groups which are not to be transmitted according to the identified scale can be embedded in a supergroup and by means of which a classification is executed by a following step-by-step summation of all the scales respectively belonging to a block in an integrator I where $i=2\ldots3$ is preferably applies and $E(i)$ is the scale for the coefficient group i and whereby $E_f(1) = E(1)$ applies and the classification serves the purpose for deciding whether a block is to be transmitted and what way a block to be transmitted is to be coded.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
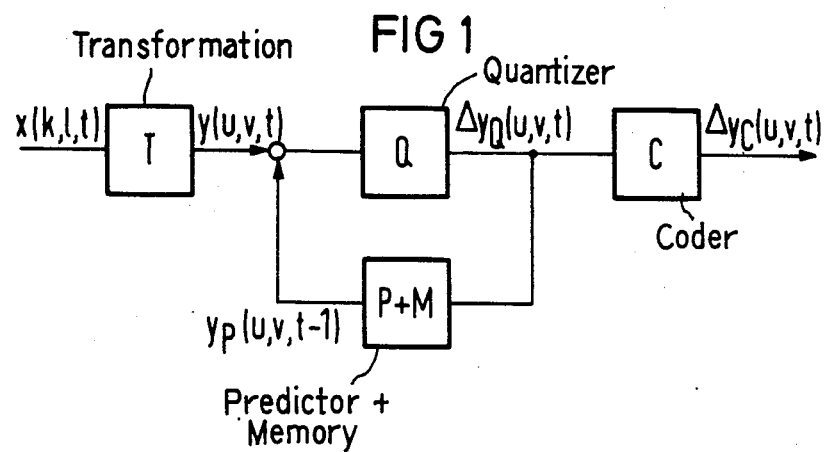
FIG. 1 is a schematic illustration illustrating the basic concept of prior art hybrid coding.
Figure 2:
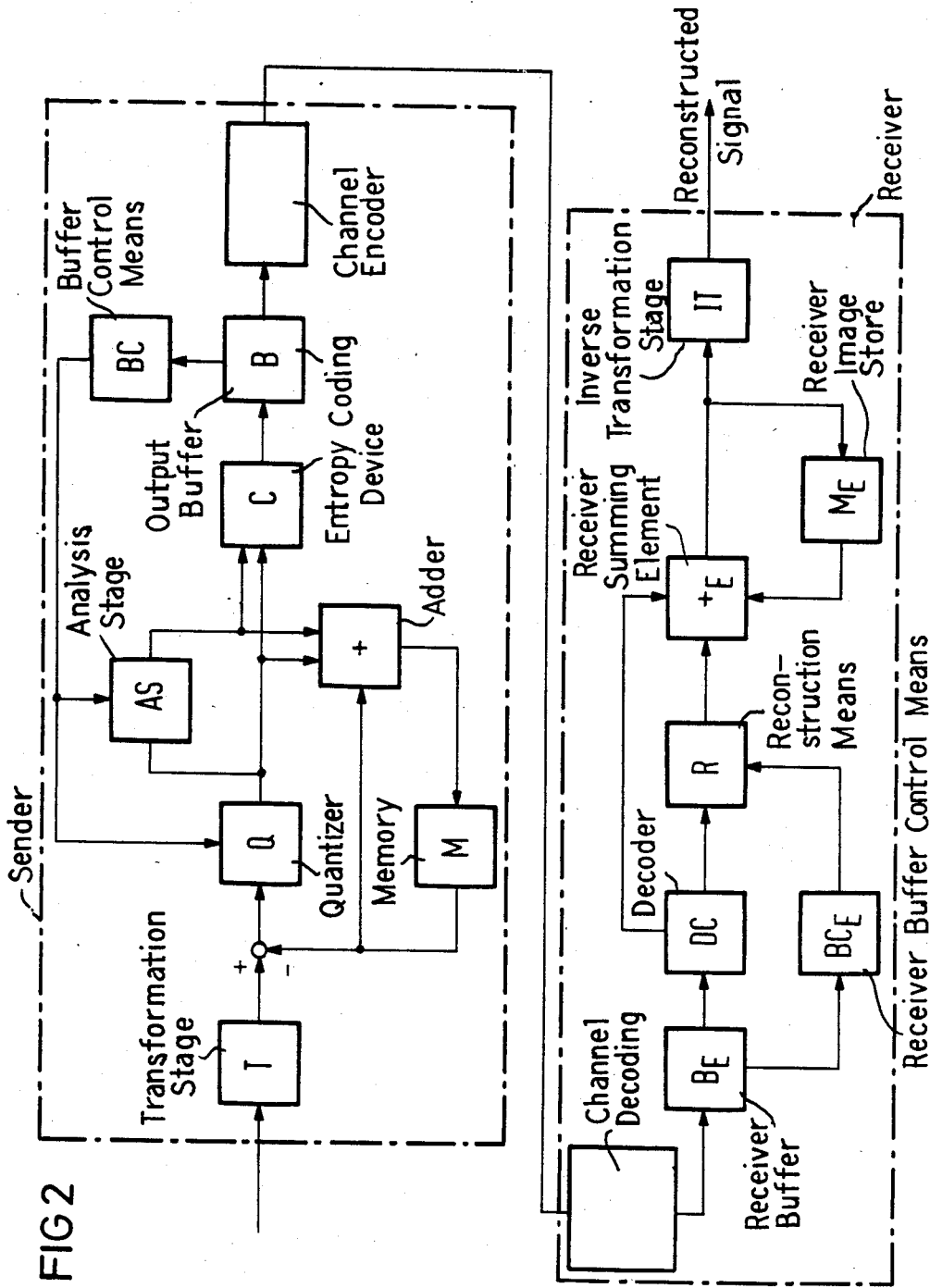
FIG. 2 is a block diagram of a complete transmission system according to a preferred exemplary embodiment according to the invention.

As shown in FIG. 2, a transmitter has a transformation stage T which transforms the signal with a discrete cosine transformation (DCT). The invention can be utilized with other transformations as well. The coding method occurs as shown in the block circuit diagrams of FIGS. 2 and 3 for the transmitter and FIGS. 2 and 4 for the receiver. As shown in FIG. 2, the transmitter has a transformation stage T which transforms the sign and supplies it to a subtractor which supplies an output to a quantizer Q. The quantizer supplies an input to an adder which supplies an output to a memory M which also supplies an input to the adder and the memory M also supplies an input to the subtractor. A coding device HC receives the output of the quantizer and also an output of an analysis stage AS which receives an input from the quantizer Q. The coding device supplies an output to the output buffer B which supplies an output to the channel encoding device. The output buffer also supplies an input to the buffer control means BC which supplies inputs to the quantizer Q and to the analysis stage AS.

The output of the channel encoding means of the transmitter is supplied to the receiver wherein a channel decoding means receives the incoming signal and supplies it to a receiver buffer $B_E$ which supplies an output to a decoder DC which supplies an output to a reconstruction means R. A receiver buffer control means $BC_E$ receives an output from the receiver buffer $B_E$ and supplies an input to the reconstructions means R. A receiver summing means $+_E$ receives the output of the reconstruction means and also an input from the decoder DC. The receiver summing means supplies an output to the innertransformation stage IT which produces the reconstructed signal. The receiver summing means $+_E$ also supplies an input to a receiver image storer $M_E$ which supplies an input to the receiver summing element.

Figure 3:
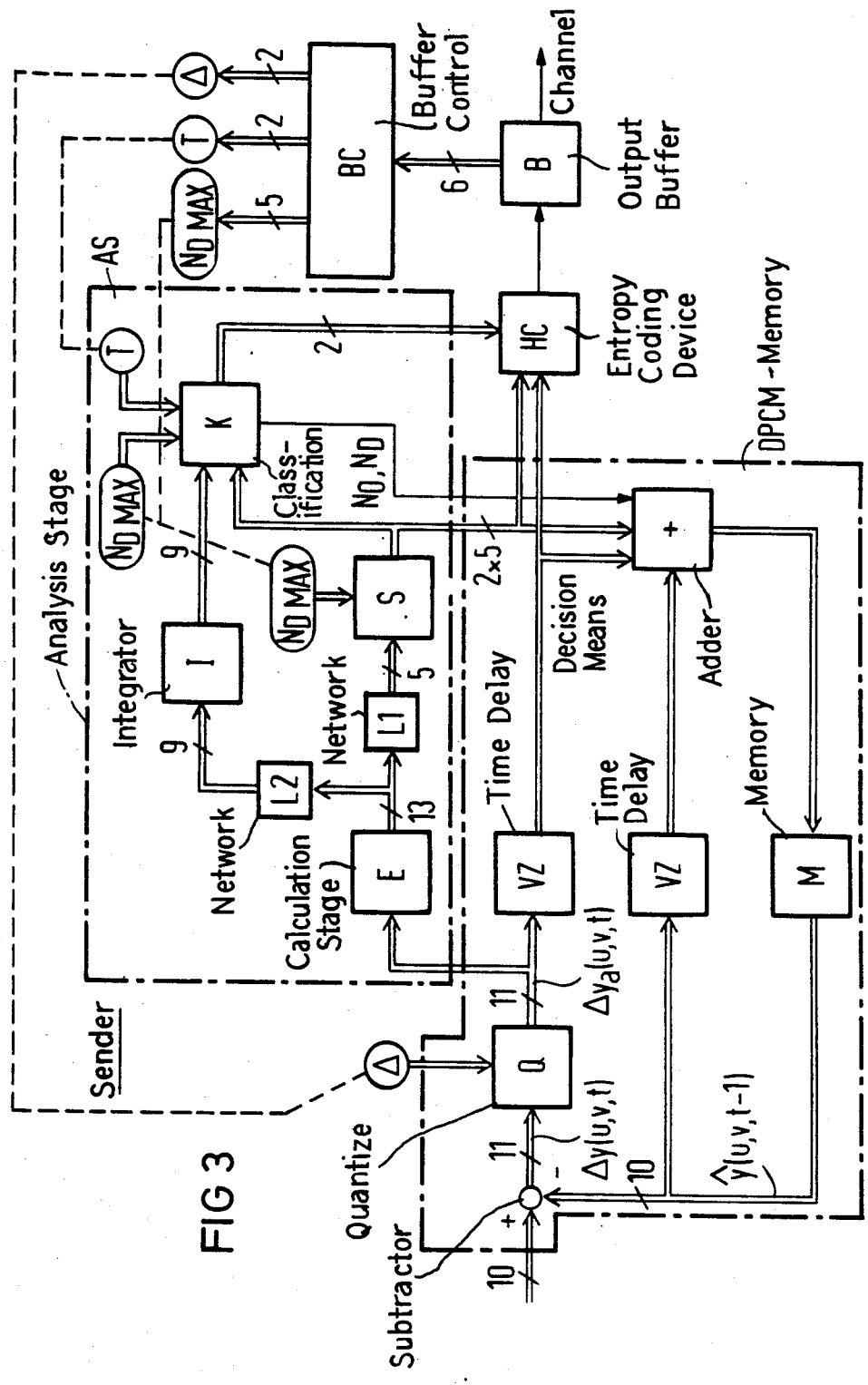
FIG. 3 is a block diagram of a transmitter of the exemplary embodiment of the transmission system shown in FIG. 2.
Figure 4:
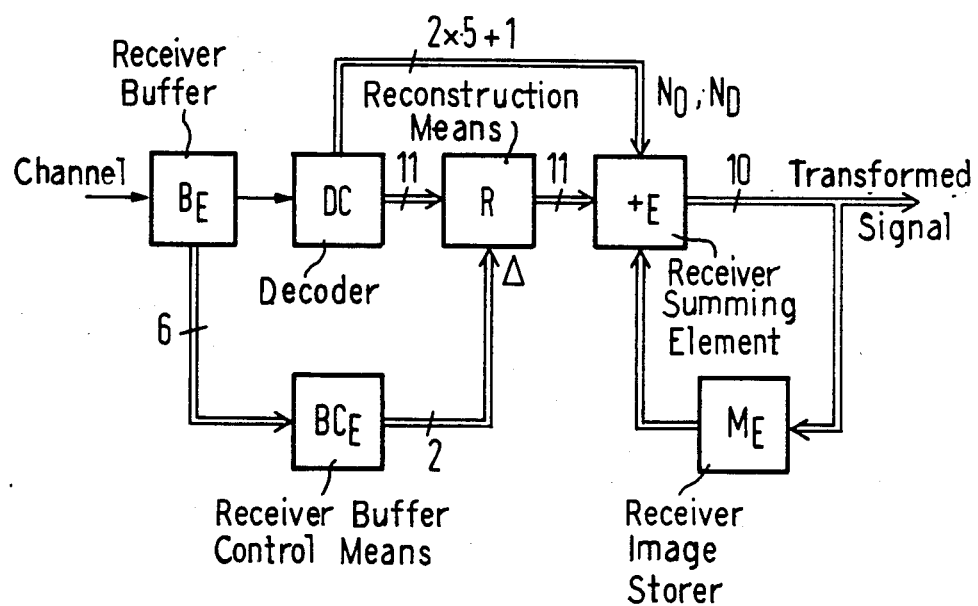
FIG. 4 is a block circuit diagram of a receiver according to the exemplary embodiment shown in FIG. 2.

FIG. 3 illustrates in greater detail portions of the transmitter where the output of the transformation stage T is supplied to the subtractor which supplies an output to the quantizer Q which supplies an output to the first time delay VZ which supplies an output to the entropy coding device HC. An adder also receives output from the first time delay VZ as well as an output of a decision means S and an output of a classification device K. The adder supplies an output to a memory M which supplies an output to the subtractor. A second time delay VZ receives the output of the memory and supplies an input to the adder. The analysis stage AS comprises a calculation stage E which receives the output of the quantizer Q and supplies an input to a first network L1 and a second network L2. A decision means S receives the output of the first network L1 as well as an input $N_{DMAX}$ from the buffer control BC. An integrator I receives the output of the second network L2 and supplies an input to the classification stage K which receives an input T from the buffer control BC as well as an input $N_{DMAX}$ from the buffer control BC. The buffer control also supplies an input $\neq$ to the quantizer Q as illustrated. The entropy coding device HC supplies an output to the output buffer B which produces the output channel signal which is to be transmitted and also supplies an input to the buffer control BC.

The receiver buffer BE receives the incoming channel signal and supplies it to a decoder DC which supplies an output to the reconstruction means R. A receiver buffer control means $BC_E$ receives an output from the receiver buffer $B_E$ and supplies an input to the reconstruction means R. The decoder DC supplies an input to a receiver summing means $+_E$ which also receives the output of reconstruction means R. The transformed signal appears at the output of the receiver summing means $+_E$ and the output of the receiver summing means $+_E$ is supplied to a receiver image storer $M_E$ which also supplies an input to the receiver summing means $+E$.

The incoming frames are two-dimensionally cosine transformed in blocks (block size 16×16 picture points). The block size 8×8 can be simply realized by modification of Huffman code tables 1B and of the bit allocation matrices, Table 2 attached. The difference between the spectral coefficients thus obtained and the corresponding coefficients in the DPCM memory M is then quantized in block Q according to the quantization interval $\Delta$ determined by the buffer control.

Figure 5A:
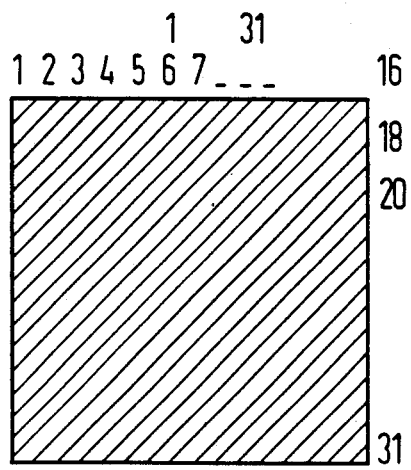
FIG. 5a is a schematic illustration of a preferred exemplary embodiment of the manner in which a field comprising mxn coefficients is subdivided into coefficient groups in the form of imaginary diagonal strips.
Figure 5B:
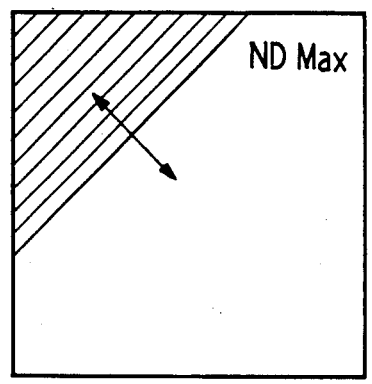
FIG. 5b is a schematic illustration which shows how a buffer control in the method of the invention effects the coder output rate by limiting the number of coefficient groups to be transmitted.
Figure 5C:
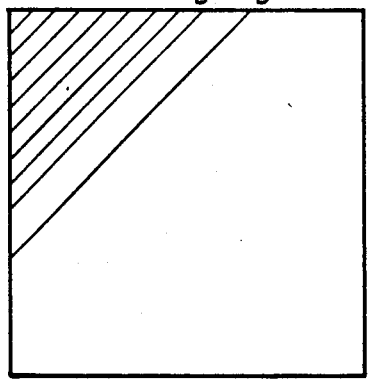
FIGS. 5c and 5d show how neighboring coefficient groups are combined in a supergroup.
Figure 5D:
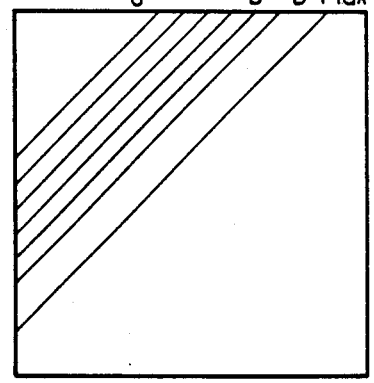

The energy calculation stage E is then defined for each coefficient group as illustrated in FIG. 5A from the quanzation prediction error signal $\Delta y_Q(u, v, t)$.

$$E(i) = \sum_{u=0}^{i-1} f_A(y_Q^2(u, i-1-u)), \quad (1)$$

whereby $f_A(x) \begin{cases} x & x < 2^{12} \\ = \\ 2^{12} & x \geq 2^{12} \end{cases}$ It is assured by the limit function $f_A(x)$ that the result t of $\Delta Y_Q^2$ is not represented with more bits than needed for further processing. The accumulator employed for the summation likewise has only twelve bits whereby a thirteenth bit is set to "1" and remains as soon as overflow has once occured.

The energies E(i) obtained in this manner are forwarded to the decision means S through a network L1. L1 limits the amplitude range to $E^*(i) \cdot (0 \leq E^*(i) \leq 16)$ so that $E^*(i)$ can be represented with 5 bits.

Whether a coefficient group is to be transmitted is determined in the stage S for every coefficient group on the basis of its energy by comparison to thresholds deposited in table form. The number of the first coefficient group to be transmitted supplies $N_O$ whereas the number of the last coefficient group to be transmitted supplies $N_D$. When $N_O < 4$ then it is equated with "1". In case no coefficient group to be transmitted has been found, $N_O$ and $N_D$ are equated with "1". It is therefore assured that the block is classified as unmoved given the classification K as well. The buffer control can influence the rate by assigning the maximum plurality of coefficient groups.

In case that $N_D$ is greater than a value $N_{DMAX}$ prescribed by the buffer control, then $ND = N_{DMAX}$ is to be set.

The output of the decision means S is forwarded for classification K to the classification means K and to a coding means HC and to a conditioned adder (+).

The output of the calculation stage E supplies the energies E(i) to an integrator I through a network L2 which cuts off or truncates the least four significant bits. The integrator forms the signal EI(i) from E(i) according to the following equation.

$$E_I(i) = E_I(i-1) + E(i) \quad i = 2 2, \ldots, 31$$
and
$$E_I(1) = E(1)$$

Only the bits having the significance of 0 ... 7 are thereby taken into consideration in the addition, whereas bit 8, OR-operated with the overflow bit of the adder, yields the bit 8 of the accumulator, so that 9-bit code words are again present at the output of the integrator I.

Figure 6A:
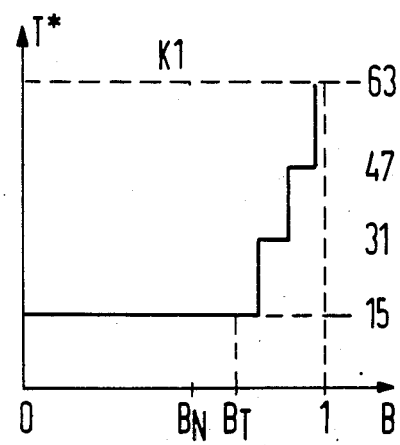
FIGS. 6a, 6b and 6c illustrate the characteristics of a buffer control.

The classification stage K executes the following operations:

$E_I(N_D) > T$ (barrier T=0,1,2,3 prescribed by the buffer control) → block moved $E_I(N_D) \leq T \rightarrow$ block unmoved $\quad (3)$ By cutting off or truncating the four least-significant bits in the energy calculation, the four values of the barrier or threshold T specified in the relationship of equation (3) result from FIG. 6a as shown by curve K1.

When the block is unmoved, it is assigned to the "unmoved" class 4. When the block is moved and thus, is to be transmitted, then the energy of the supergroup to be transmitted is defined as:

$$E_G = \begin{cases} E_I(N_D) - E_I(N_O - 1) & N_O \neq 1 \\ E_I(N_D) - E_I(1) & N_O = 1 \end{cases} \quad (4)$$

and with the assistance of $E_G$, the block is assigned to one of three "moved" classes.

The two necessary class boundaries $G(N_O, N_D, 1)$ and $G(N_O, N_D, 2)$ are identified in the following fashion:

$$G(N_O, N_D, k) = \begin{cases} E_{Hg}(N_D, k) - E_{Hg}(N_O - 1, k) & \text{when } N_O \neq 1 \\ E_{Hg}(N_D, k) - E_{Hg}(1, k) & \text{when } N_O = 1 \end{cases} \quad (5)$$

$$E_{Hg}(N_D, k) = \frac{1}{2} \sum_{i=1}^{N_D} i(E_H(B(i,l,k)) + E_H(B(i,l,k+1)))$$

where $E_H$ is the mean energy variance presumed in the generation of the Huffman code tables B(i, j, k) is the allocation matrix f of the Huffman code tables for class K (table 2), $E_{Hg}$ is the energy up to the diagonal $N_D$ averaged over class k and k+1.

$$E_G \geq G(N_O, N_D, 1) \Rightarrow \text{Class 1} \quad (6)$$

$$G(N_O, N_D, 1) > E_G \geq G(N_O, N_D, 2) \Rightarrow \text{Class 2}$$

$$E_G < G(N_O, N_D, 2) \Rightarrow \text{Class 3}$$

The case discrimination and the calculation of $G(N_O, N_D, k)$ and $E_G$ results that the like component in all classes is coded with the same Huffman code table for maximum variance. Its energy therefore remains unconsidered in the classification. The supergroup to be transmitted is then coded in the entropy coding means HC and written into the output buffer B. The code tables 1-7 of table 1 are employed therefore and these being selected for every coefficient via the allocation matrices in table 2. So-called "modified" Huffman codes are employed in the coding. Values $/y/ \leq y_{esc}$ are thereby Huffman-coded. Given $/y/ > y_{esc}$, an escape word is transmitted followed by the value of y in the natural code. The quantization interval can assume the values $\Delta_o, \Delta_o/2, \Delta_o/4, \Delta_o/8$. Amplitude levels of 255, 511, 1023 and 2047 correspond to these values. These natural code words therefore have different lengths (8, 9, 10, 11 bits).

The class affiliation and the supergroup $(N_O, N_D)$ must be additionally transmitted for every block. The following bit rates are required for this overhead:

First case: 2 bits when k=4 ("unmoved" class)
Second case: 2 bits + the average word length indicated in table 1B ("Huffman" code tables for supergroup and class when k=1 through 3.

Last, the DPCM memory is brought to the current reading. The supergroup and the class affiliation are therefore to be considered as:

$$y'(u,v,t) = y'(u,v,t-1) \text{ when } k = 4v[(u+v+1) < N_0]v \quad (7)$$

$$[(u+v+1) > N_D]$$

$$Y'(u,v,t) = Y'(u,v,t-1) + \Delta y_Q(u,v,t) \text{ otherwise.}$$

(Buffer Control)

Figure 6B:
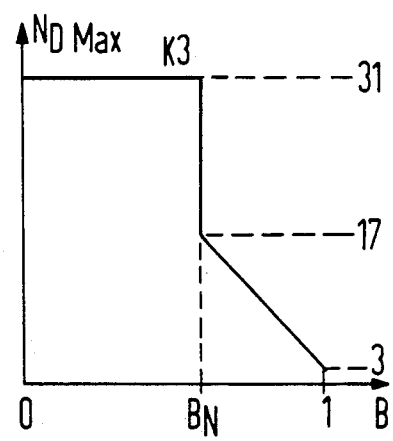

As set forth above, a constant channel rate is achieved by modification of the barrier "moved"/"unmoved" T, of the quantization interval $\Delta$ and of the diagonal $N_{DMAX}$ to be maximally transmitted. The values T, $\Delta$, $N_{DMAX}$ illustrated in FIG. 6b are identified by the non-linear characteristics K1 through K3 depending on the filling of the buffer.

In the region $B_n < B(k) \leq 1$ (characteristic K3), the rate is controlled via $N_{DMAX}$.

Figure 6C:
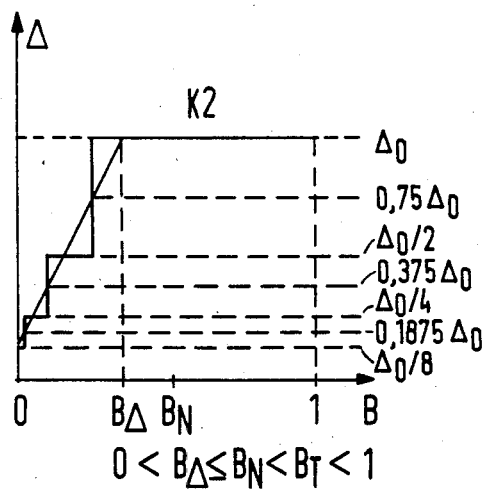

No control results for $B\Delta \leq B(k) \leq 1$. When $0 \leq B(k) < B\Delta$ occurs, then the buffer control results via the quantization interval $\Delta$ shown in FIG. 6c. $\Delta$ can thereby only assume values that meet the following inequality.

$$0 \leq \text{int }(1d\Delta o/\Delta)) \leq 3 \quad (8)$$

As previously set forth, the quantization interval must also be considered in the coding.

Assuming a very full buffer $B(k) > B_T$ illustrated by the characteristic K1 in FIG. 6a, the barrier T is also raised by a quadratic characteristic K1. The raising of the barrier "moved"/"unmoved" then occurs in two ways:

(a) increase of T by the characteristic K1
(b) reduction of $N_{DMAX}$ and, thus, of the total energy $(E_G)$ by characteristic K3.

A very efficient noise suppression with full buffer is achieved by means of (b).

Significant innovations over known methods of the present invention are:

(1) Buffer Control

Way of limiting the bit rate by omitting coefficient groups when the buffer runs full. The number of coefficient groups is therefore controlled with a proportional controller.

Control of the rate by way of the quantization interval given a buffer running empty with a proportional controller. The quantization interval can therefore only assume the values of $\Delta_o, \Delta_o/2, \Delta_o/4, \Delta_o/8$.

Way of recognizing altered blocks by calculation of the energy of the quantitized signal. This is identical to a coupling of the "moved"/"unmoved" T to the quantization interval. A good value for T is $T = N^2/12$. This T is constant over a wide range of the buffer filling.

Raising the barrier T given buffer running full by way of a quadratic characteristic.

The controller for the number of diagonals to be maximally transmitted and the controller for the quantization interval never work in common but only respectively one operates dependent on the fill of the buffer.

The fact that only the coefficient groups that are transmitted are taken into consideration for the modification recognition for blocks is an advantage.

2. Coding

Adaptive Huffman coding by fixed allocation of the Huffman code tables for three "moved" categories (previously there has been dynamic allocation of the Huffman code tables (HCT) /1/ and fixed allocation of non-linear optimum n-bit maxquantizers /2/).

Classification on the basis of the quantized signal.

Way of identifying the class boundaries from the allocation of the Huffman code tables and the variance for which the HCT are generated.

Way of recognizing and coding modified supergroups within a block (in /1/, by length of run coding and end of block code word).

The fact that only the coefficient groups that are transmitted are considered for the modified recognition of blocks.

The tables which are utilized in this invention follow.

TABLE 1

Huffman Code Table (A) For Coefficients
Given code word numbers unequal to zero and Huffman code of the Operation sign is appended to the tables:
(1) Less Than Zero VZ = 1
(2) Greater Than Zero VZ = 0
(The code word length in the corresponding code words is therefore greater than the length of the code in the table.)

| Code Table Number: | 1 |
|---|---|
| Number of words: | 511 |
| Scanner: | 0.75 |
| Residual Probability | 0.00100 |
| Actual Residual Probility | 0.00021 |
| Mean Word Length: | 1.8520 |
| Entropy: | 1.6386 |

| Code Word Number | Huffman Code | Word Length | Probability |
|---|---|---|---|
| 0 | 0 | 1 | 0.609749 |
| 1 | 10 | 3 | 0.165409 |
| 2 | 110 | 4 | 0.025191 |
| 3 | 1110 | 5 | 0.003837 |
| 4 | 11110 | 6 | 0.000584 |
| 5 Escape Word | 11111 | 14 | 0.000089 |
| 6 | ESC | 14 | 0.000014 |
| 7 | ESC | 14 | 0.000002 |
| 8 | ESC | 14 | 0.000000 |
| 9 | ESC | 14 | 0.000000 |
| 10 | ESC | 14 | 0.000000 | and so forth until NW/2 = 255

| Code Table Number | 2 |
|---|---|
| Number of words | 511 |
| Scanner | 1.50 |
| Residual Probability | 0.00100 |
| Actual Residual Probability | 0.00086 |
| Mean Word Length | 2.6491 |
| Entropy | 2.5680 |

| Code Word Number | Huffman Code | Word length | Probability |
|---|---|---|---|
| 0 | 00 | 2 | 0.375299 |
| 1 | 1 | 2 | 0.190455 |
| 2 | 010 | 4 | 0.074325 |
| 3 | 0110 | 5 | 0.029006 |
| 4 | 01110 | 6 | 0.011319 |
| 5 | 011110 | 7 | 0.004417 |
| 6 | 0111110 | 8 | 0.001724 |
| 7 | 01111110 | 9 | 0.000673 |
| 8 Escape Word | 01111111 | 17 | 0.000263 |
| 9 | ESC | 17 | 0.000102 |
| 10 | ESC | 17 | 0.000040 |
| 11 | ESC | 17 | 0.000016 |
| 12 | ESC | 17 | 0.000006 |

TABLE 1-continued
Huffman Code Table

| | | | |
|---|---|---|---|
| 13 | ESC | 17 | 0.000002 |
| and so forth until NW/2 = 255 | | | |

| | |
|---|---|
| Code Table Number: | 3 |
| Number of Words: | 511 |
| Scanner: | 3.00 |
| Residual Probability | 0.00100 |
| Actual Residual Probability | 0.00068 |
| Entropy | 3.5416 |

| Code Word Number | | Huffman Code | Word Length | Probability |
|---|---|---|---|---|
| 0 | | 00 | 2 | 0.209620 |
| 1 | | 10 | 3 | 0.148314 |
| 2 | | 110 | 4 | 0.092652 |
| 3 | | 010 | 4 | 0.057880 |
| 4 | | 1110 | 5 | 0.036158 |
| 5 | | 0110 | 5 | 0.022588 |
| 6 | | 11110 | 6 | 0.014111 |
| 7 | | 01110 | 6 | 0.008815 |
| 8 | | 111110 | 7 | 0.005507 |
| 9 | | 011110 | 7 | 0.003440 |
| 10 | | 1111110 | 8 | 0.002149 |
| 11 | | 0111110 | 8 | 0.001342 |
| 12 | | 11111110 | 9 | 0.000839 |
| 13 | | 01111110 | 9 | 0.000524 |
| 14 | | 111111110 | 10 | 0.000327 |
| 15 | | 111111111 | 10 | 0.000204 |
| 16 | Escape Word | 01111111 | 17 | 0.000128 |
| 17 | | ESC | 17 | 0.000080 |
| 18 | | ESC | 17 | 0.000050 |
| 19 | | ESC | 17 | 0.000031 |
| 20 | | ESC | 17 | 0.000019 |
| 21 | | ESC | 17 | 0.000012 |
| and so forth until NW/2 = 255 | | | | |

| | |
|---|---|
| Code Table Number: | 4 |
| Number of Words: | 511 |
| Scanner: | 6.00 |
| Residual Probability | 0.00800 |
| Actual Residual Probability | 0.00636 |
| Mean Word Length | 4.5988 |
| Entropy: | 4.5335 |

| Code Word Number | | Huffman Code | Word Length | Probability |
|---|---|---|---|---|
| 0 | | 000 | 3 | 0.110967 |
| 1 | | 01 | 3 | 0.093179 |
| 2 | | 100 | 4 | 0.073647 |
| 3 | | 110 | 4 | 0.058209 |
| 4 | | 1010 | 5 | 0.046007 |
| 5 | | 1110 | 5 | 0.036363 |
| 6 | | 0010 | 5 | 0.028741 |
| 7 | | 10110 | 6 | 0.022716 |
| 8 | | 11110 | 6 | 0.017954 |
| 9 | | 00110 | 6 | 0.014191 |
| 10 | | 101110 | 7 | 0.011216 |
| 11 | | 111110 | 7 | 0.008865 |
| 12 | | 001110 | 7 | 0.007007 |
| 13 | | 1011110 | 8 | 0.005538 |
| 14 | | 1111110 | 8 | 0.004377 |
| 15 | | 0011110 | 8 | 0.003460 |
| 16 | | 10111110 | 9 | 0.002734 |
| 17 | | 11111110 | 9 | 0.002161 |
| 18 | | 101111110 | 10 | 0.001708 |
| 19 | | 101111111 | 10 | 0.001350 |
| 20 | | 111111110 | 10 | 0.001067 |
| 21 | | 111111111 | 10 | 0.000843 |
| 22 | Escape Word | 0011111 | 16 | 0.000667 |
| 23 | | ESC | 16 | 0.000527 |
| 24 | | ESC | 16 | 0.000416 |
| 25 | | ESC | 16 | 0.000329 |
| 26 | | ESC | 16 | 0.000260 |
| 27 | | ESC | 16 | 0.000206 |
| and so forth until NW/2 = 255 | | | | |

| | |
|---|---|
| Code Table Number: | 5 |
| Number of Words: | 511 |
| Scanner: | 12.00 |
| Residual Probability | 0.00800 |
| Actual Residual Probability | 0.00759 |
| Mean Word Length | 5.5889 |
| Entropy | 5.5313 |

| Code Word Number | Huffman Code | Word Length | Probability |
|---|---|---|---|
| 0 | 0000 | 4 | 0.057114 |
| 1 | 001 | 4 | 0.052314 |

TABLE 1-continued
Huffman Code Table

| Code Word Number | | Huffman Code | Word Length | Probability |
|---|---|---|---|---|
| 2 | | 010 | 4 | 0.046509 |
| 3 | | 1000 | 5 | 0.041348 |
| 4 | | 1010 | 5 | 0.036760 |
| 5 | | 1100 | 5 | 0.032681 |
| 6 | | 1110 | 5 | 0.029054 |
| 7 | | 0110 | 5 | 0.025830 |
| 8 | | 10010 | 6 | 0.022964 |
| 9 | | 10110 | 6 | 0.020416 |
| 10 | | 11010 | 6 | 0.018150 |
| 11 | | 11110 | 6 | 0.016136 |
| 12 | | 00010 | 6 | 0.014346 |
| 13 | | 01110 | 6 | 0.012754 |
| 14 | | 100110 | 7 | 0.011339 |
| 15 | | 101110 | 7 | 0.010080 |
| 16 | | 110110 | 7 | 0.008962 |
| 17 | | 111110 | 7 | 0.007967 |
| 18 | | 000110 | 7 | 0.007083 |
| 19 | | 011110 | 7 | 0.006297 |
| 20 | | 1001110 | 8 | 0.005598 |
| 21 | | 1011110 | 8 | 0.004977 |
| 22 | | 1101110 | 8 | 0.004425 |
| 23 | | 1111110 | 8 | 0.003934 |
| 24 | | 0001110 | 8 | 0.003497 |
| 25 | | 0111110 | 8 | 0.003109 |
| 26 | | 10011110 | 9 | 0.002764 |
| 27 | | 10111110 | 9 | 0.002457 |
| 28 | | 11011110 | 9 | 0.002185 |
| 29 | | 00011110 | 9 | 0.001942 |
| 30 | | 00011111 | 9 | 0.001727 |
| 31 | | 01111110 | 9 | 0.001535 |
| 32 | | 100111110 | 10 | 0.001365 |
| 33 | | 101111110 | 10 | 0.001213 |
| 34 | | 101111111 | 10 | 0.001079 |
| 35 | | 110111110 | 10 | 0.000959 |
| 36 | | 011111110 | 10 | 0.000853 |
| 37 | | 011111111 | 10 | 0.000758 |
| 38 | | 1001111110 | 11 | 0.000674 |
| 39 | | 1001111111 | 11 | 0.000599 |
| 40 | | 1101111110 | 11 | 0.000533 |
| 41 | | 1101111111 | 11 | 0.000474 |
| 42 | Escape Word | 1111111 | 16 | 0.000421 |
| 43 | | ESC | 16 | 0.000374 |
| 44 | | ESC | 16 | 0.000333 |
| 45 | | ESC | 16 | 0.000296 |
| 46 | | ESC | 16 | 0.000263 |
| 47 | | ESC | 16 | 0.000234 |
| and so forth until NW/2 = 255 | | | | |

| | |
|---|---|
| Code Table Number: | 6 |
| Number of Words: | 511 |
| Scanner: | 24.00 |
| Residual Probability | 0.01000 |
| Actual Residual Probability | 0.00989 |
| Mean Word Length: | 6.5860 |
| Entropy: | 6.5307 |

| Code Word Number | Huffman Code | Word Length | Probability |
|---|---|---|---|
| 0 | 00000 | 5 | 0.028976 |
| 1 | 0001 | 5 | 0.027729 |
| 2 | 0010 | 5 | 0.026145 |
| 3 | 0100 | 5 | 0.024652 |
| 4 | 0110 | 5 | 0.023244 |
| 5 | 10000 | 6 | 0.021917 |
| 6 | 10010 | 6 | 0.020665 |
| 7 | 10100 | 6 | 0.019485 |
| 8 | 10110 | 6 | 0.018372 |
| 9 | 11000 | 6 | 0.017323 |
| 10 | 11010 | 6 | 0.016333 |
| 11 | 11100 | 6 | 0.015400 |
| 12 | 11110 | 6 | 0.014521 |
| 13 | 00110 | 6 | 0.013692 |
| 14 | 01010 | 6 | 0.012910 |
| 15 | 01110 | 6 | 0.012172 |
| 16 | 100010 | 7 | 0.011477 |
| 17 | 100110 | 7 | 0.010822 |
| 18 | 101010 | 7 | 0.010203 |
| 19 | 101110 | 7 | 0.009621 |
| 20 | 110010 | 7 | 0.009071 |
| 21 | 110110 | 7 | 0.008553 |
| 22 | 111010 | 7 | 0.008065 |
| 23 | 111110 | 7 | 0.007604 |

TABLE 1-continued
Huffman Code Table

| | | | |
|---|---|---|---|
| 24 | 000010 | 7 | 0.007170 |
| 25 | 001110 | 7 | 0.006760 |
| 26 | 010110 | 7 | 0.006374 |
| 27 | 011110 | 7 | 0.006010 |
| 28 | 1000110 | 8 | 0.005667 |
| 29 | 1001110 | 8 | 0.005343 |
| 30 | 1010110 | 8 | 0.005038 |
| 31 | 1011110 | 8 | 0.004750 |
| 32 | 1100110 | 8 | 0.004479 |
| 33 | 1101110 | 8 | 0.004223 |
| 34 | 1110110 | 8 | 0.003982 |
| 35 | 1111110 | 8 | 0.003755 |
| 36 | 0000110 | 8 | 0.003540 |
| 37 | 0011110 | 8 | 0.003338 |
| 38 | 0101110 | 8 | 0.003147 |
| 39 | 0111110 | 8 | 0.002968 |
| 40 | 10001110 | 9 | 0.002798 |
| 41 | 10001111 | 9 | 0.002638 |
| 42 | 10011110 | 9 | 0.002488 |
| 43 | 10111110 | 9 | 0.002346 |
| 44 | 11001110 | 9 | 0.002212 |
| 45 | 11011110 | 9 | 0.002085 |
| 46 | 11101110 | 9 | 0.001966 |
| 47 | 11111110 | 9 | 0.001854 |
| 48 | 00001110 | 9 | 0.001748 |
| 49 | 00111110 | 9 | 0.001648 |
| 50 | 00111111 | 9 | 0.001554 |
| 51 | 01011110 | 9 | 0.001465 |
| 52 | 01111110 | 9 | 0.001382 |
| 53 | 100111110 | 10 | 0.001303 |
| 54 | 101111110 | 10 | 0.001228 |
| 55 | 110011110 | 10 | 0.001158 |
| 56 | 110111110 | 10 | 0.001092 |
| 57 | 110111111 | 10 | 0.001030 |
| 58 | 111011110 | 10 | 0.000971 |
| 59 | 111111110 | 10 | 0.000915 |
| 60 | 000011110 | 10 | 0.000863 |
| 61 | 000011111 | 10 | 0.000814 |
| 62 | 010111110 | 10 | 0.000767 |
| 63 | 011111110 | 10 | 0.000723 |
| 65 | 1001111111 | 11 | 0.000643 |
| 66 | 1011111110 | 11 | 0.000606 |
| 67 | 1100111110 | 11 | 0.000572 |
| 68 | 1100111111 | 11 | 0.000539 |
| 69 | 1110111110 | 11 | 0.000508 |
| 70 | 1110111111 | 11 | 0.000479 |
| 71 | 1111111110 | 11 | 0.000452 |
| 72 | 1111111111 | 11 | 0.000426 |
| 73 | 0101111110 | 11 | 0.000402 |
| 74 | 0101111111 | 11 | 0.000379 |
| 75 | 0111111110 | 11 | 0.000357 |
| 76 | 0111111111 | 11 | 0.000337 |
| 77 | 10111111110 | 12 | 0.000318 |
| 78 | 10111111111 | 12 | 0.000299 |
| 79 Escape Word | 1010111 | 16 | 0.000282 |
| 80 | ESC | 16 | 0.000266 |
| 81 | ESC | 16 | 0.000251 |
| 82 | ESC | 16 | 0.000237 |
| 83 | ESC | 16 | 0.000223 |
| 84 | ESC | 16 | 0.000210 |
| and so forth until NW/2 = 255 | | | |

| | |
|---|---|
| Code Table Number: | 7 |
| Number of Words: | 511 |
| Scanner: | 48.00 |
| Residual Probability | 0.03000 |
| Actual Residual Probability | 0.02943 |
| Mean Word Length | 7.6155 |
| Entropy: | 7.5384 |

| Code Word Number | Huffman Code | Word Length | Probability |
|---|---|---|---|
| 0 | 000000 | 6 | 0.014453 |
| 1 | 00010 | 6 | 0.014141 |
| 2 | 00100 | 6 | 0.013735 |
| 3 | 00110 | 6 | 0.013342 |
| 4 | 00111 | 6 | 0.012959 |
| 5 | 01000 | 6 | 0.012587 |
| 6 | 01010 | 6 | 0.012226 |
| 7 | 01100 | 6 | 0.011876 |
| 8 | 01110 | 6 | 0.011535 |
| 9 | 100000 | 7 | 0.011204 |
| 10 | 100010 | 7 | 0.010883 |
| 11 | 100100 | 7 | 0.010571 |
| 12 | 100110 | 7 | 0.010268 |
| 13 | 101000 | 7 | 0.009973 |
| 14 | 101010 | 7 | 0.009687 |
| 15 | 101100 | 7 | 0.009409 |
| 16 | 101110 | 7 | 0.009139 |
| 17 | 110000 | 7 | 0.008877 |
| 18 | 110010 | 7 | 0.008623 |
| 19 | 110100 | 7 | 0.008375 |
| 20 | 110110 | 7 | 0.008135 |
| 21 | 111000 | 7 | 0.007902 |
| 22 | 111010 | 7 | 0.007675 |
| 23 | 111100 | 7 | 0.007455 |
| 24 | 000001 | 7 | 0.007241 |
| 25 | 000010 | 7 | 0.007034 |
| 26 | 000110 | 7 | 0.006832 |
| 27 | 001010 | 7 | 0.006636 |
| 28 | 010010 | 7 | 0.006446 |
| 29 | 010110 | 7 | 0.006261 |
| 30 | 011010 | 7 | 0.006081 |
| 31 | 011110 | 7 | 0.005907 |
| 32 | 1000010 | 8 | 0.005737 |
| 33 | 1000110 | 8 | 0.005573 |
| 35 | 1001110 | 8 | 0.005258 |
| 36 | 1010010 | 8 | 0.005107 |
| 37 | 1010110 | 8 | 0.004961 |
| 38 | 1011010 | 8 | 0.004818 |
| 39 | 1011011 | 8 | 0.004680 |
| 40 | 1011110 | 8 | 0.004546 |
| 41 | 1100010 | 8 | 0.004416 |
| 42 | 1100110 | 8 | 0.004289 |
| 43 | 1101010 | 8 | 0.004166 |
| 44 | 1101110 | 8 | 0.004046 |
| 45 | 1110010 | 8 | 0.003930 |
| 46 | 1110110 | 8 | 0.003818 |
| 47 | 1111010 | 8 | 0.003708 |
| 48 | 0000110 | 8 | 0.003602 |
| 49 | 0001110 | 8 | 0.003498 |
| 50 | 0010110 | 8 | 0.003398 |
| 51 | 0100110 | 8 | 0.003301 |
| 52 | 0100111 | 8 | 0.003206 |
| 53 | 0101110 | 8 | 0.003114 |
| 54 | 0110110 | 8 | 0.003025 |
| 55 | 0111110 | 8 | 0.002938 |
| 56 | 10000110 | 9 | 0.002854 |
| 57 | 10001110 | 9 | 0.002772 |
| 58 | 10010110 | 9 | 0.002692 |
| 59 | 10011110 | 9 | 0.002615 |
| 60 | 10011111 | 9 | 0.002540 |
| 61 | 10100110 | 9 | 0.002467 |
| 62 | 10101110 | 9 | 0.002397 |
| 63 | 10111110 | 9 | 0.002328 |
| 64 | 11000110 | 9 | 0.002261 |
| 65 | 11001110 | 9 | 0.002196 |
| 66 | 11010110 | 9 | 0.002133 |
| 67 | 11011110 | 9 | 0.002072 |
| 68 | 11011111 | 9 | 0.002013 |
| 69 | 11100110 | 9 | 0.001955 |
| 70 | 11101110 | 9 | 0.001899 |
| 71 | 11110110 | 9 | 0.001844 |
| 72 | 00001110 | 9 | 0.001792 |
| 73 | 00011110 | 9 | 0.001740 |
| 74 | 00101110 | 9 | 0.001690 |
| 75 | 00101111 | 9 | 0.001642 |
| 76 | 01011110 | 9 | 0.001595 |
| 77 | 01101110 | 9 | 0.001549 |
| 78 | 01111110 | 9 | 0.001505 |
| 79 | 01111111 | 9 | 0.001461 |
| 80 | 100001110 | 10 | 0.001419 |
| 81 | 100011110 | 10 | 0.001379 |
| 82 | 1001k01110 | 10 | 0.001339 |
| 83 | 1001011111 | 10 | 0.001301 |
| 84 | 101001110 | 10 | 0.001263 |
| 85 | 101011110 | 10 | 0.001227 |
| 86 | 101111110 | 10 | 0.001192 |
| 87 | 101111111 | 10 | 0.001158 |
| 88 | 110001110 | 10 | 0.001125 |
| 89 | 110011110 | 10 | 0.001092 |
| 90 | 110101110 | 10 | 0.001061 |
| 91 | 110101111 | 10 | 0.001031 |

TABLE 1-continued
Huffman Code Table

| | | | |
|---|---|---|---|
| 92 | 111001110 | 10 | 0.001001 |
| 93 | 111011110 | 10 | 0.000972 |
| 94 | 111101110 | 10 | 0.000944 |
| 95 | 111101111 | 10 | 0.000917 |
| 96 | 000011110 | 10 | 0.000891 |
| 97 | 000111110 | 10 | 0.000866 |
| 98 | 000111111 | 10 | 0.000841 |
| 99 | 010111110 | 10 | 0.000817 |
| 100 | 010111111 | 10 | 0.000793 |
| 101 | 011011110 | 10 | 0.000770 |
| 102 | 011011111 | 10 | 0.000748 |
| 103 | 1000011110 | 11 | 0.000727 |
| 104 | 1000011111 | 11 | 0.000706 |
| 105 | 1000011110 | 11 | 0.000686 |
| 106 | 1000111111 | 11 | 0.000666 |
| 107 | 1010011110 | 11 | 0.000647 |
| 108 | 1010011111 | 11 | 0.000628 |
| 109 | 1010111110 | 11 | 0.000610 |
| 110 | 1010111111 | 11 | 0.000593 |
| 111 | 1100011110 | 11 | 0.000576 |
| 112 | 1100011111 | 11 | 0.000559 |
| 113 | 1100111110 | 11 | 0.000543 |
| 114 | 1100111111 | 11 | 0.000528 |
| 115 | 1110011110 | 11 | 0.000513 |
| 116 | 1110011111 | 11 | 0.000498 |
| 117 | 1110111110 | 11 | 0.000484 |
| 118 | 1110111111 | 11 | 0.000470 |
| 119 | 0000111110 | 11 | 0.000456 |
| 120 | 0000111111 | 11 | 0.000443 |
| 121 Escape Word | 11111 | 14 | 0.000431 |
| 122 | ESC | 14 | 0.000418 |
| 123 | ESC | 14 | 0.000406 |
| 124 | ESC | 14 | 0.000395 |
| 125 | ESC | 14 | 0.000383 |
| 126 | ESC | 14 | 0.000372 | and so forth until NW/2 = 255

(B) Code tables for transmitted subregion and class affiliation:
11 unmoved class
00 Greatest Detail content
01 Mean Detail content
10 Smallest Detail content
In the moved classes subregion is codes as follows:
(1) $N_O = 1$
No. of diagonals equal code word number in "Huffman Code Table for subregion
(2) Code Word number 32 escape word for:
$N_D > 16$ and simultaneous $N_O \geq 4$
Escape word is transmitted first and $N_D$ is then transmitted with 4 bits and $N_O$ transmitted with 5 bits total 16 bits.
(3) Following Table valid for
$4 \leq N_O \leq 16$ and simultaneous $4 \leq N_D \leq 16$
The code word number in "Huffman code table for subregion"
Possible combination for ND and NO then for subregions.

| NO ↓ | ND→ 4 | 5 | 6 | 7 | 8 | 9 | 10 | 11 | 12 | 13 | 14 | 15 | 16 |
|---|---|---|---|---|---|---|---|---|---|---|---|---|---|
| 4 | 33 | 34 | 35 | 36 | 37 | 38 | 39 | 40 | 41 | 42 | 43 | 44 | 45 |
| 5 | | 46 | 47 | 48 | 49 | 50 | 51 | 52 | 53 | 54 | 55 | 56 | 57 |
| 6 | | | 58 | 59 | 60 | 61 | 62 | 63 | 64 | 65 | 66 | 67 | 68 |
| 7 | | | | 69 | 70 | 71 | 72 | 73 | 74 | 75 | 76 | 77 | 78 |
| 8 | | | | | 79 | 80 | 81 | 82 | 83 | 84 | 85 | 86 | 87 |
| 9 | | | | | | 88 | 89 | 90 | 91 | 92 | 93 | 94 | 95 |
| 10 | | | | | | | 96 | 97 | 98 | 99 | 100 | 101 | 102 |
| 11 | | | | | | | | 103 | 104 | 105 | 106 | 107 | 108 |
| 12 | | | | | | | | | 109 | 110 | 111 | 112 | 113 |
| 13 | | | | | | | | | | 114 | 115 | 116 | 117 |
| 14 | | | | | | | | | | | 118 | 119 | 120 |
| 15 | | | | | | | | | | | | 121 | 122 |
| 16 | | | | | | | | | | | | | 123 |

Huffman Code Table for subregion
Division Content: 6.94251
Entropy: 5.29115
Mid word length 5.34360

| Code Word Number | Huffman Code | Word Length | Probability |
|---|---|---|---|
| 1 | 0000 | 4 | 0.055531 |
| 2 | 0100 | 4 | 0.055531 |
| 3 | 0101 | 4 | 0.055531 |
| 4 | 0110 | 4 | 0.055531 |
| 5 | 0111 | 4 | 0.055531 |
| 6 | 1000 | 4 | 0.055531 |
| 7 | 1001 | 4 | 0.055531 |
| 8 | 1010 | 4 | 0.055531 |
| 9 | 1011 | 4 | 0.055531 |
| 10 | 1100 | 4 | 0.055531 |
| 11 | 00010 | 5 | 0.027766 |
| 12 | 11010 | 5 | 0.027766 |
| 13 | 11011 | 5 | 0.027766 |
| 14 | 11100 | 5 | 0.027766 |
| 15 | 11101 | 5 | 0.027766 |
| 16 | 11110 | 5 | 0.027766 |
| 17 | 000110 | 6 | 0.013883 |
| 18 | 111110 | 6 | 0.013883 |
| 19 | 00011100 | 8 | 0.003471 |
| 20 | 00011110 | 8 | 0.003471 |
| 21 | 0001110100 | 10 | 0.000868 |
| 22 | 0001110110 | 10 | 0.000868 |
| 23 | 0001110111 | 10 | 0.000868 |
| 24 | 0001111100 | 10 | 0.000868 |
| 25 | 00011101010 | 11 | 0.000434 |
| 26 | 00011111010 | 11 | 0.000434 |
| 27 | 00011111011 | 11 | 0.000434 |
| 28 | 00011111100 | 11 | 0.000434 |
| 29 | 00011111101 | 11 | 0.000434 |
| 30 | 00011111110 | 11 | 0.000434 |
| 31 | 00011111111 | 11 | 0.000434 |
| 32 | 1111110 | 7 | 0.006941 |
| 33 | 001000 | 6 | 0.027766 |
| 34 | 1111111 | 7 | 0.006941 |
| 35 | 00100100 | 8 | 0.006941 |
| 36 | 001001010 | 9 | 0.003471 |
| 37 | 001001011 | 9 | 0.003471 |
| 38 | 001001100 | 9 | 0.003471 |
| 39 | 001001101 | 9 | 0.003471 |
| 40 | 001001110 | 9 | 0.003471 |
| 41 | 0010011110 | 10 | 0.001735 |
| 42 | 0010011111 | 10 | 0.001735 |
| 43 | 00101000000 | 11 | 0.000868 |
| 44 | 00101000001 | 11 | 0.000868 |
| 45 | 0010101 | 7 | 0.013883 |
| 46 | 00101001 | 8 | 0.006941 |
| 47 | 001010001 | 9 | 0.003471 |
| 48 | 001011000 | 9 | 0.003471 |
| 49 | 001011001 | 9 | 0.003471 |
| 50 | 0010110100 | 10 | 0.001735 |
| 51 | 00101000011 | 11 | 0.000868 |
| 52 | 00101101010 | 11 | 0.000868 |
| 53 | 00101101011 | 11 | 0.000868 |
| 54 | 00101101110 | 11 | 0.000868 |
| 55 | 001010000101 | 12 | 0.000434 |
| 56 | 001011011010 | 12 | 0.000434 |
| 57 | 0010111 | 7 | 0.013883 |
| 58 | 001100000 | 9 | 0.003471 |
| 59 | 001100001 | 9 | 0.003471 |
| 60 | 001100010 | 9 | 0.003471 |
| 61 | 0010110111 | 10 | 0.001735 |
| 62 | 00110001100 | 11 | 0.000868 |
| 63 | 00110001101 | 11 | 0.000868 |
| 64 | 00110001110 | 11 | 0.000868 |
| 65 | 00110001111 | 11 | 0.000868 |
| 66 | 001011011011 | 12 | 0.000434 |
| 67 | 001100100000 | 12 | 0.000434 |
| 68 | 0011010 | 7 | 0.013883 |
| 69 | 001100101 | 9 | 0.003471 |
| 70 | 001100110 | 9 | 0.003471 |
| 71 | 0011001001 | 10 | 0.001735 |
| 72 | 00110010001 | 11 | 0.000868 |
| 73 | 00110011100 | 11 | 0.000868 |
| 74 | 00110011101 | 11 | 0.000868 |
| 75 | 00110011111 | 11 | 0.000868 |
| 76 | 001100100001 | 12 | 0.000434 |
| 77 | 001100111110 | 12 | 0.000434 |
| 78 | 00110110 | 8 | 0.006941 |
| 79 | 001101110 | 9 | 0.003471 |
| 80 | 0011011110 | 10 | 0.001735 |
| 81 | 00110111110 | 11 | 0.000868 |
| 82 | 00110111111 | 11 | 0.000868 |
| 83 | 00111000000 | 11 | 0.000868 |
| 84 | 00111000001 | 11 | 0.000868 |
| 85 | 001100111111 | 12 | 0.000434 |

TABLE 1-continued

Huffman Code Table

| | | | |
|---|---|---|---|
| 87 | 001110000100 | 12 | 0.000434 |
| 88 | 00111001 | 8 | 0.006941 |
| 89 | 0011100010 | 10 | 0.001735 |
| 90 | 00111000011 | 11 | 0.000868 |
| 91 | 00111000110 | 11 | 0.000868 |
| 92 | 00111000111 | 11 | 0.000868 |
| 93 | 00111010000 | 11 | 0.000868 |
| 94 | 001110000101 | 12 | 0.000434 |
| 95 | 001110100010 | 12 | 0.000434 |
| 96 | 00111011 | 8 | 0.006941 |
| 97 | 00111010010 | 11 | 0.000868 |
| 98 | 00111010011 | 11 | 0.000868 |
| 99 | 00111010100 | 11 | 0.000868 |
| 100 | 00111010101 | 11 | 0.000868 |
| 101 | 001110100011 | 12 | 0.000434 |
| 102 | 001110101100 | 12 | 0.000434 |
| 103 | 00111000 | 9 | 0.003471 |
| 104 | 00111010111 | 11 | 0.000868 |
| 105 | 00111100100 | 11 | 0.000868 |
| 106 | 00111100101 | 11 | 0.000868 |
| 107 | 001110101101 | 12 | 0.000434 |
| 108 | 001111001100 | 12 | 0.000434 |
| 109 | 001111010 | 9 | 0.003471 |
| 110 | 00111100111 | 11 | 0.000868 |
| 111 | 00111101100 | 11 | 0.000868 |
| 113 | 001111011010 | 12 | 0.000434 |
| 114 | 001111100 | 9 | 0.003471 |
| 115 | 00111101110 | 11 | 0.000868 |
| 116 | 001111011011 | 12 | 0.000434 |
| 117 | 001111011110 | 12 | 0.000434 |
| 118 | 001111101 | 9 | 0.003471 |
| 119 | 001111011111 | 12 | 0.000434 |
| 120 | 000111010110 | 12 | 0.000434 |
| 121 | 001111110 | 9 | 0.003471 |
| 122 | 000111010111 | 12 | 0.000434 |
| 123 | 001111111 | 9 | 0.003471 |

TABLE 2

Allocation Matrices Fixed Allocation Huffman Code Table for the Three Moved Classes

CLASS 1

```
7 6 5 4 4 3 3 3 2 2 2 2 1 1 1 1
6 5 4 4 3 3 3 2 2 2 2 1 1 1 1 1
5 4 4 3 3 3 2 2 2 2 1 1 1 1 1 1
4 4 3 3 3 2 2 2 2 1 1 1 1 1 1 1
4 3 3 3 2 2 2 2 1 1 1 1 1 1 1 1
3 3 3 2 2 2 2 1 1 1 1 1 1 1 1 1
3 3 2 2 2 2 1 1 1 1 1 1 1 1 1 1
3 2 2 2 2 1 1 1 1 1 1 1 1 1 1 1
2 2 2 2 1 1 1 1 1 1 1 1 1 1 1 1
2 2 2 1 1 1 1 1 1 1 1 1 1 1 1 1
2 2 1 1 1 1 1 1 1 1 1 1 1 1 1 1
2 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
```

CLASS 2

```
7 5 4 3 3 2 2 2 1 1 1 1 1 1 1 1
5 4 3 3 2 2 2 1 1 1 1 1 1 1 1 1
4 3 3 2 2 2 1 1 1 1 1 1 1 1 1 1
3 3 2 2 2 1 1 1 1 1 1 1 1 1 1 1
3 2 2 2 1 1 1 1 1 1 1 1 1 1 1 1
2 2 2 1 1 1 1 1 1 1 1 1 1 1 1 1
2 2 1 1 1 1 1 1 1 1 1 1 1 1 1 1
2 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
```

CLASS 3

```
7 4 3 2 2 1 1 1 1 1 1 1 1 1 1 1
4 3 2 2 1 1 1 1 1 1 1 1 1 1 1 1
```

TABLE 2-continued

Allocation Matrices Fixed Allocation Huffman Code Table for the Three Moved Classes

```
3 2 2 1 1 1 1 1 1 1 1 1 1 1 1 1
2 2 1 1 1 1 1 1 1 1 1 1 1 1 1 1
2 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
1 1 1 1 1 1 1 1 1 1 1 1 1 1 1 1
```

Although the invention has been described with respect to preferred embodiments, it is not to be so limited as changes and modifications can be made which are within the full intended scope of the invention as defined by the appended claims.

We claim as our invention:

1. A method for picture data reduction for digital video signals, comprising a pre-processing of the signals by means of block-by-block transformation method, whereby a transformed and quantized signal that was generated at a time of t−1 and deposited in an image store is subtracted from a transformed signal that occurs at a time t to obtain a difference signal and whereby the difference signal is subjected to a quantization, comprising the steps of, analyzing the quantitized difference signal and delaying for a time (VZ) which corresponds to the time requirement for the analysis (AS) said difference signal for updating the content of the image store, adding delayed signal to the signal read out from the image store (M) which has been correspondingly delayed, said adding being dependent on an addition condition signal acquired from said analysis, and applying an entropy coding (HC) to said signal which depends on the results of said analysis, said addition condition signals containing information as to whether a block whose analysis has been concluded is a "moved"or "unmoved" block and, in case said block is a "moved" block, containing information regarding a coefficient group to be transmitted; buffering the signal coded in such fashion with a buffer (B) for supplying an output signal channel a uniform data flow for transmission, obtaining said uniform data flow from the non-uniform data flow of the entropy coding; influencing depending on the degree of the fill of the buffer a quantization stage (Q) and an analysis stage (AS) whereby a signal from a buffer control means (BC) is supplied to the quantization stage (Q), and selecting one of a plurality of pre-determined quantization characteristics, supplying a second signal from the buffer control means (BC) to the analysis stage (AS) for selecting the maximum number of coefficient groups, and supplying a third signal to the analysis stage (AS) from the buffer control means (BC) for deciding whether a block is to be transmitted or is not to be transmitted; subdividing the coefficients representing the digitized video signal transformed block-by-block into coefficient groups according to prescribed rules; and identifying a value for each of the coefficient groups in a calculation stage (E), and determining from said value whether a super-group formed in a decision means (S) from neighboring coefficient groups is to be transmitted is selected, whereby coefficient groups which are not to be transmitted based on said identified value can also be arranged in such a supergroup, and secondly, classifying in a mediated fashion, following a step-by-step summation $$E_f(i) = E_f(i-1) + E(i)$$

of all values respectively belonging to a block in an integrator (I), whereby $i = 2 \ldots 31$ preferably applies, whereby E(i) is the value for the coefficient group i and whereby $E_f(1) = E(1)$ applies, said classification serving the purpose to decide whether a block is to be transmitted and the manner in which a block to be transmitted is to be coded.

2. A method according to claim 1, wherein the coefficient groups are formed such that coefficients (y(u, v)) whose matrix indices (u,v) meet the condition $$u + v = i - 1$$

are respectively combined to form a coefficient group (i), whereby u, $v = 0 \ldots 15$ and whereby u, v are the horizontal or, respectively, vertical discrete frequencies.

3. A method according to claims 1 or 2, characterized in that said value for the selection of a coefficient group and for classification is $$MASS(i) = \sum_{u=0}^{i-1} |\Delta y_Q(u, i - 1 - u)|^k$$

whereby i is the number of a coefficient group, whereby k can have the values 1, 2, 3 ..., and whereby $\Delta y_Q(u, i-1-u)$ is the quantized difference signal of the coefficients (u, i−1−u).

4. A method according to claim 3, characterized in that the value for the selection of a coefficient group and for the classification is the energy $$E(i) = \sum_{u=0}^{i-1} \Delta y_Q^2(u, i - 1 - u)$$

of a coefficient group (i), whereby $\Delta y_Q(u, i-1-u)$ is the quantized difference signal of the coefficients (u,i−1−u).

5. A method according to claim 3, characterized in that the value for the selection of a coefficient group and for the classification is the sum of the absolute values $$EB(i) = \sum_{u=0}^{i-1} |\Delta y_Q(u, i - 1 - u)|$$

of a coefficient group (i), whereby $\Delta y_Q(u, i-1-u)$ is the quantized difference signal of the coefficients (u, i−1−u).

6. A method according to claim 1, characterized in that the quantization is executed such that respectively like quantization intervals are employed for all amplitude ranges of the signal to be quantized, so that a linear quantization results.

7. A method according to claim 6, characterized in that the quantization is executed dependent on the picture activity; and a selection of one of four quantization intervals which respectively differ by the factor "2" is accomplished.

8. A method according to claim 1, characterized in that a block-wise classification in four classes is carried out, said classes serving the purpose of respectively selecting one of four coding allocation tables, whereby one of these four classes is an "unmoved" class.

9. A method according to claim 8, characterized in that the classification is executed such that, in a first step, a decision is made from a data field respectively supplied by the integrator (I) as to whether the appertaining block is to be classified as "moved" or "unmoved", whereby, when the block is classified as "unmoved", a 2-bit code word is generated for said class 4 which is the "unmoved" class or, respectively, a decision is made in a second and, under given conditions, a third step concerning which of three "moved" classes, namely class 1 ... class 3, said block is to be allocated to, whereby the energy belonging to the supergroup to be transmitted is identified from the data field $(E_f)$ and is successively compared to two thresholds read out and edited from first and second tables, a 2-bit code word being respectively generated under given conditions for said classes 1 ... 3.

10. A method according to claim 1, characterized in that seven code tables of variable word length are employed for the purpose of coding, whereby on code table (1) is provided for extremely small signal variances and one code table (7) is provided for extremely large signal variances, whereby the code table (i) respectively differs from the code table (i+1) in that it is generated for a signal variance which is greater by the factor "4".

11. A method according to claims 9 or 10, characterized in that the allocation of the code tables to the individual coefficients of a block is done with the assistance of three allocation tables of which one is selected by means of one of the identified classes for a "moved" block.

12. A method according to claim 1, characterized in that an eighth code table is provided for coding the supergroup to be transmitted; and an auxiliary table is provided which is employed to select therefrom the code word number of the eighth code table allocated to this supergroup for every combination of the values ($N_O$ and $N_D$) for limiting the super-group to be transmitted.

13. A method according to claim 10, characterized in that the seven code tables are Huffman code tables.

14. A method according to claim 12 wherein the eighth code table is a Huffman code table.

15. A method according to claim 1 characterized in that a buffer control means (BC) defines the maximum allowable number of coefficient groups as well as the threshold for the decision "moved"/"unmoved" and modifies the quantization resolution "memory-free" dependent on the degree that the buffer memory is filled.

16. A method according to claim 15, characterized in that the maximum number of coefficient groups ($N_{NMAX}$) is defined by the relationship $$N_{DMax} = \left\{ \begin{array}{c} 31 \\ trun \end{array} \left| \frac{14B + 3B_N - 17}{B_N - 1} \right| \begin{array}{c} B \leq B_N \\ B > B_N, \end{array} \right.$$

wherein trun (truncated) is the "cut-off" function of the illustrated function and whereby $B_N$ preferably lies in the range of 0.3 ... 0.6; and in that the threshold (T) for the decision "moved"/"unmoved" is varied by the relationship $$T = \begin{cases} 0 & B \leq B_T \\ trun\left[\left(\frac{B-B_T}{1-B_T}+1\right)-0{,}5\right] & B > B_T, \end{cases}$$

wherein $B_T$ preferably lies in the range of 0.6 ... 0.8; and in the quantizer resolution $\Delta$ is varied with an intermediate value $\Delta^*$ which varies with the degree of the filling of the buffer memory and is related to the buffer memory length, which varies by the relationship $$\Delta^* \begin{cases} \Delta_o & B \geq B_\Delta \\ = \frac{7}{8} \frac{\Delta_o}{B_\Delta} B + \frac{\Delta_o}{8} & B < B_\Delta \end{cases}$$

whereby the quantizer resolution is established from this intermediate value $\Delta^*$ under the following conditions:
 when $0.75\Delta_o \leq \Delta^*$ applies, then $\Delta = \Delta_o$ applies,
 when $0.375\Delta_o \leq \Delta^* < 0.75\Delta_o$, then $\Delta = \Delta_o/2$ applies,
 when $0.1875\Delta_o \leq \Delta^* < 0.375\Delta_o$ applies, then $\Delta = \Delta_o/4$ applies,
 when $\Delta^* < 0.1875\Delta_o$ applies, then $\Delta = \Delta_o/8$ applies,
 whereby $B_\Delta$ preferably has values between 0.4 and 0.6.

17. A method according to claim 16, characterized in the tabular values are determined for the relationships for $N_{DMAX}$, T and $\Delta$, and these tabular values are addressed on the basis of the six most significant bits of the degree of buffer filling.

18. Apparatus for picture data reduction for digital video signals comprising, a receiver with a receiver buffer memory ($B_E$), a decoder (DC) connected to said receiver buffer memory $B_E$, a reconstruction means (R) connected to said decoder, a receiver buffer control means ($BC_E$) connected between said receiver buffer memory $B_E$ and said reconstruction means (R), a receiver summing element ($+_E$) receiving inputs from said decoder and said reconstruction means, and a receiver image store ($M_E$) connected to said receiver summing element, the data-reduced digital video signal is supplied to said receiver buffer memory ($B_E$) after a channel decoding; said decoder (DC) reconstructs a signal with constant word length from the preferably Huffman-coded signal intermediately stored in the receiver buffer memory ($B_E$); the reconstruction means (R) reproduce representative values from the numbers for representative values coded with constant word length and from a signal supplied by the receiver buffer control means ($BC_E$) for the selection of one of a plurality of quantizer tables, said receiver buffer control means ($BC_E$) produces the output signal as the source-side quantization signal, and said receiver buffer control means receives a signal indicative of the degree of filling (B) of the buffer memory from the receiver buffer memory ($B_E$); the representative values from the reconstruction means (R) are supplied to the receiver summing element ($+_E$), and addition condition signals ($N_O, N_D$ and a signal for "moved"/"unmoved") from the decoder (DC) as well as the picture signal from the receiver image store ($M_E$) reconstructed at time $t-1$ are also supplied, and the reconstructed difference signal at a time t from the reconstruction means (R) is added to the picture signal reconstructed at a time $t-1$, with the addition accomplished depending on the addition condition signals; and the reconstructed transformed picture signal obtained by said addition supplied to a inverse transformation stage (IT) and, also is supplied to said receiver image store ($M_E$).

19. Apparatus according to claim 18, characterized in that a counter is provided which measures the degree of filling of said buffer memory.

20. Apparatus according to claim 18, characterized in that a shift register is provided for delaying by n blocks the video signals.

21. Apparatus according to claim 18, characterized in that a gate chain is provided for delaying by n blocks said video data.

22. Apparatus according to claim 18, characterized in that at least one ROM memory is used for storing tables.

* * * * *